US007761897B2

(12) United States Patent
Takagi et al.

(10) Patent No.: US 7,761,897 B2
(45) Date of Patent: Jul. 20, 2010

(54) DIGITAL TELEVISION BROADCAST SIGNAL RECEIVER

(75) Inventors: Toshihiro Takagi, Daito (JP); Yoshihisa Nagamura, Daito (JP); Yasuhiro Inui, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1393 days.

(21) Appl. No.: 11/167,278

(22) Filed: Jun. 28, 2005

(65) Prior Publication Data

US 2005/0287968 A1    Dec. 29, 2005

(30) Foreign Application Priority Data

Jun. 28, 2004    (JP)    ............................. 2004-189741

(51) Int. Cl.
    *H04N 7/20*    (2006.01)
(52) U.S. Cl. .......................................... 725/72; 725/68
(58) Field of Classification Search .................. 725/68, 725/72, 139, 150; 455/269, 272, 277.2, 278
    See application file for complete search history.

(56) References Cited

U.S. PATENT DOCUMENTS

| 4,630,056 A | * | 12/1986 | Noguchi et al. ............. 342/359 |
| 5,300,935 A | * | 4/1994 | Yu ............................... 342/359 |
| 5,404,161 A | * | 4/1995 | Douglass et al. .............. 725/15 |
| 5,648,955 A | * | 7/1997 | Jensen et al. ................. 370/252 |
| 5,797,083 A | * | 8/1998 | Anderson ..................... 455/25 |
| 5,983,071 A | * | 11/1999 | Gagnon et al. ................ 725/72 |
| 5,986,720 A | * | 11/1999 | Kishigami et al. .......... 348/725 |
| 5,991,609 A | * | 11/1999 | Marrah et al. ............. 455/182.2 |
| 6,124,898 A | * | 9/2000 | Patel et al. .................. 348/607 |
| 6,127,966 A | * | 10/2000 | Erhage ........................ 342/174 |
| 6,236,839 B1 | * | 5/2001 | Gu et al. .................... 455/67.14 |
| 6,400,318 B1 | * | 6/2002 | Kasami et al. .............. 342/383 |
| 6,498,939 B1 | * | 12/2002 | Thomas ..................... 455/562.1 |
| 6,697,436 B1 | * | 2/2004 | Wright et al. ............... 375/296 |
| 6,867,819 B2 | * | 3/2005 | Lee ............................ 348/725 |
| 6,914,558 B1 | * | 7/2005 | Shirosaka et al. ........... 342/371 |
| 7,042,526 B1 | * | 5/2006 | Borseth ....................... 348/731 |

(Continued)

FOREIGN PATENT DOCUMENTS

JP    5-267919 A    10/1993

(Continued)

*Primary Examiner*—Brian T Pendleton
*Assistant Examiner*—Jonathan V. Lewis
(74) *Attorney, Agent, or Firm*—Crowell & Moring LLP (57) ABSTRACT

A TV receiver preliminarily measures and stores, in a memory, data of best receiving directions, each giving maximum signal intensity, of a multi-directional antenna for receivable channels. When the antenna rotationally shifts physically for some reason, one channel is selected and subjected to measurements by an omni-directional scanning again to determine a new best receiving direction. A receiving direction number difference between the stored best receiving direction and the new best receiving direction of the same channel is determined. Using the receiving direction number difference for the one channel, all data stored in the memory are renewed at one time, the data being the best receiving direction numbers and the signal intensities therefor for all the channels. The antenna direction can be quickly adjusted to the rotational shift by new measurements for one channel, without requiring time to make unnecessary measurements for all channels, achieving a best receiving condition steadily.

8 Claims, 5 Drawing Sheets

U.S. PATENT DOCUMENTS

| | | | |
|---|---|---|---|
| 7,136,113 B2 * | 11/2006 | Lee | 348/725 |
| 2001/0055948 A1 * | 12/2001 | Ikeda et al. | 455/13.3 |
| 2002/0042290 A1 * | 4/2002 | Williams et al. | 455/562 |
| 2002/0051085 A1 * | 5/2002 | Lee | 348/570 |
| 2003/0090416 A1 * | 5/2003 | Howell et al. | 342/359 |
| 2003/0142234 A1 * | 7/2003 | Dent | 348/554 |
| 2004/0001554 A1 * | 1/2004 | Sun et al. | 375/260 |
| 2004/0248517 A1 * | 12/2004 | Reichgott et al. | 455/63.4 |

FOREIGN PATENT DOCUMENTS

| | | |
|---|---|---|
| JP | 6-225230 A | 8/1994 |
| JP | 2003-344517 A | 12/2003 |

* cited by examiner

FIG.4

DIGITAL TELEVISION BROADCAST SIGNAL RECEIVER

BACKGROUND OF THE INVENTION

1. Field of the Invention

The present invention relates to a television broadcast signal receiver for receiving digital television broadcast signals such as ATSC (Advanced Television Systems Committee).

2. Description of the Related Art

In the North American Continent such as the United States of America where ATSC digital television (hereafter referred to simply as "TV broadcast") is broadcast, big cities spread across the plains. From the viewpoint of a television user or viewer to receive TV broadcast signals, which are broadcast in big cities or their suburbs, the TV broadcast signals or even one TV broadcast signal may come from various directions. Thus, it is necessary for the user to adjust the direction of an antenna in the direction of a broadcast tower transmitting a television broadcast signal of a television program which the user wishes to watch.

For this reason, multi-directional antennas such as a so-called smart antenna are put to practical use. On the other hand, general antennas for receiving terrestrial broadcast signals have a shape of the so-called Yagi antenna, which has a high directivity to be able to receive a weak radio wave or signal. At the same time, the Yagi antenna has a drawback that it can receive only a radio wave from one broadcast tower due to the high directivity, hence the Yagi antenna being a unidirectional antenna. Due to the high directivity, furthermore, even a slight variation in the receiving direction of the Yagi antenna may cause a significant variation in the signal intensity of a received TV broadcast signal.

Meanwhile, several methods are known for controlling the receiving direction of an antenna. For example, Japanese Laid-open Patent Publication Hei 05-267919 discloses a method for controlling to bring an antenna to a best receiving condition by using a sensor for detecting a rotation angle of the antenna. Further, Japanese Laid-open Patent Publication Hei 06-225230 discloses a method for controlling rotation of an automotive BS (Broadcast Satellite) receiving antenna by generating a direction signal and a drive signal responding to signal level determination. Still further, Japanese Laid-open Patent Publication 2003-344517 discloses a method for controlling an automotive BS receiving antenna to track a satellite by varying a rotational speed of the antenna as the signal intensity received by the antenna varies.

As described above, according to the ATSC digital television broadcast in the United States of America, the broadcast signals or waves may come from various directions, so that multi-directional antennas such as a smart antenna are needed to receive such TV broadcasts. The EIA (Electronic Industries Association)-909 standard provides a smart antenna having sixteen equiangular receiving directions in 360 degrees. A digital TV (television) broadcast signal receiver conforming to the EIA-909 standard is set to be able to adjust or switch an active signal receiving direction of the multi-directional antenna such as the smart antenna to every one of the sixteen receiving directions.

Some of such digital TV broadcast signal receivers have an omni-directional scanning function (automatic scanning function) to select the receiving direction of an antenna in which a digital TV broadcast signal of a channel selected by a user can be best received. This can be done by scanning the sixteen directions for each channel, and by setting the best receiving direction as a receiving direction for the channel, because usually the position of a broadcast antenna or a broadcast tower of a broadcast station does not change. However, in countries like the United States of America, broadcast stations may go into bankruptcy while it is relatively easy to open new broadcast stations. Accordingly, channels which could not previously be received may become receivable, while channels which could previously be received may become unreceivable. Furthermore, the receiving conditions of digital TV broadcast signals may change due to newly built high rise buildings. For this reason, it may be necessary to reset the best receiving direction for the channel selected by the user.

In such case, a multi-directional antenna which can switch the receiving direction in a short time can be connected to a digital TV broadcast signal receiver having the omni-directional scanning function. However, even with the multi-directional antenna, it may take a very long time to determine a best receiving direction of the antenna for receiving a TV broadcast signal of the channel selected by the user because a receiving direction control signal for switching the receiving direction may be output at very long intervals, thereby causing the user to get irritated. For solving this problem, a multi-directional antenna such as a smart antenna is designed such that at an initial setting, best receiving directions and maximum signal levels of received TV broadcast signals for all local channels in all directions are measured by taking time in advance, and are stored in a built-in memory of a TV broadcast signal receiver. For channel selection, the memory can be accessed to enable immediate adjustment of the antenna to point at a broadcast tower for a desired channel.

However, when e.g. an indoor antenna is used, it is quite probable that a user would change a place of installing the antenna, or physically change a receiving direction of the installed antenna by mistake, making it likely to generate a trouble that TV images suddenly become unreceivable. In such case, once the receiving direction of the antenna changes, data of the receiving directions for respective channels stored in the TV broadcast receiver become inaccurate and meaningless. In order to restore a normal receiving condition, it is required to perform an omni-directional scanning process and measure signal intensities or levels in all receiving directions of the antenna for all channels again from the beginning. This causes a problem that requires a very laborious work and an unnecessary consumption of time and energy.

SUMMARY OF THE INVENTION

An object of the present invention is to provide a digital TV broadcast signal receiver that can effectively use once stored data of each channel to prevent unnecessary scanning rotation of a multi-directional antenna, and can quickly control the antenna to point in a receiving direction to give a maximum signal intensity so as to determine and maintain a best receiving direction of the antenna, thereby steadily achieving a best receiving condition, and that can further reduce time and number of scans required to select a desired channel to receive.

The object is achieved according to the present invention by a digital television broadcast signal receiver connected to a multi-directional antenna having multiple receiving directions for receiving a television broadcast signal by making one of the multiple receiving directions active, the digital television broadcast signal receiver comprising: a receiving direction control signal output unit for outputting, to the multi-directional antenna, a receiving direction control signal to command a receiving direction for receiving the television broadcast signal; a tuner connected to the multi-directional antenna for receiving the television broadcast signal and measuring signal intensity of the received television broadcast signal; a broadcast signal processing unit for subjecting the television broadcast signal received by the tuner to a predetermined signal processing; an image signal output unit for outputting, to a monitor, the television broadcast signal having been subjected to the predetermined signal processing by the broadcast signal processing unit; a memory for temporarily storing the television broadcast signal having been subjected to the predetermined signal processing by the broadcast signal processing unit; a receiving direction determining unit for determining a best receiving direction for each receivable channel using the television broadcast signal stored in the memory; an antenna direction adjustment unit controlled by the receiving direction control signal output unit for adjusting rotational shift of the receiving direction of the multi-directional antenna; and a main controller for controlling respective elements in the digital television broadcast signal receiver.

The receiving direction control signal output unit sequentially outputs, to the multi-directional antenna at given time intervals, a receiving direction control signal to sequentially command receiving directions of the multi-directional antenna for omni-directional scanning. The tuner sequentially measures signal intensities of the television broadcast signal in the multiple receiving directions for each of multiple channels. Further, the antenna direction adjustment unit stores, in the memory: the measured signal intensities in the respective receiving directions; a best receiving direction to give maximum signal intensity for each of the channels; and the maximum signal intensity for the each of the channels in the best receiving direction.

When detecting that the signal intensity of a television broadcast signal for one channel received by the tuner is lower than the maximum signal intensity for the received channel stored in the memory, the receiving direction control signal output unit controls the receiving direction of the multi-directional antenna. When a further receiving direction to give a maximum signal intensity for at least one of the channels newly received by the tuner is different from the receiving direction to give the maximum signal intensity of the same at least one of the channels which is stored in the memory, the antenna direction adjustment unit determines a receiving direction number difference of the multi-directional antenna, in the multiple receiving directions, between the receiving direction and the further receiving direction for the same at least one of the channels, and shifts the receiving direction numbers, stored in the memory, of the multiple receiving directions at one time by the receiving direction number difference so as to electronically renew, at one time, data of the receiving directions and the signal intensities for all the channels stored in the memory.

In other words, the digital television broadcast signal receiver according to the present invention first determines, for one channel, a difference between a receiving direction of a multi-directional antenna stored at an initial setting and a further receiving direction of the antenna measured after a rotational shift of the antenna. Thereby, the amount of the rotational shift (difference in the receiving direction due to the rotational shift) can be easily obtained. Using the amount of the rotational shift for the one channel, it is possible to renew or rewrite the stored data of receiving directions for all channels, and hence the data of maximum signal intensities linked and corresponding thereto as well, easily in a short time by shifting the receiving direction number for each of the channels by the same amount of the rotational shift. Thus, when the multi-directional antenna rotationally shifts, it is not necessary to make measurements for all the channels again, or to consume unnecessary time and energy for adjusting the receiving direction of the multi-directional antenna, thereby making it possible to immediately provide a normal receiving of a TV broadcast signal, and preventing a user from getting irritated.

Preferably, the digital television broadcast signal receiver further comprises an antenna direction adjustment switch to be operated by a user to force the digital television broadcast signal receiver into an antenna direction adjustment mode. When the tuner sequentially measures signal intensities of the television broadcast signal in the multiple receiving directions for the each of multiple channels, the main controller further stores, in the memory, a threshold value for the each of the channels which is set to be lower by a predetermined level than the maximum signal intensity for the each of the channels so as to serve as a reference to start the omni-directional scanning of the multi-directional antenna. When detecting that the signal intensity of a television broadcast signal for one channel received by the tuner is lower than the threshold value for the received channel stored in the memory, the receiving direction control signal output unit controls the receiving direction of the multi-directional antenna.

When signal intensity for at least one of the channels newly received by the tuner is, and remains for a predetermined delay time, lower than the threshold value stored in the memory, or when the user turns on the antenna direction adjustment switch, the antenna direction adjustment unit performs a new omni-directional scanning for one rotation through the multiple receiving directions of the multi-directional antenna so as to obtain a receiving direction number, being referred to as $D_N$, to give a maximum signal intensity among the multiple receiving directions, and stores, in the memory, the receiving direction number $D_N$ and the maximum signal intensity in the receiving direction number $D_N$. The antenna direction adjustment unit compares the receiving direction number $D_N$ with the receiving direction number, being referred to as $D_M$, for the same at least one of the channels which is stored in the memory before the new omni-directional scanning, so as to determine a receiving direction number difference, being referred to as L, between the receiving direction numbers $D_N$ and $D_M$. Furthermore, the antenna direction adjustment unit shifts, at one time by the receiving direction number difference L, both the receiving direction numbers and the signal intensities linked to the receiving direction numbers of the multiple receiving directions, all of which are stored in the memory, so as to electronically renew, at one time, the data of the receiving directions and the signal intensities for all the channels stored in the memory.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 5A is a flow chart showing a process of a receiving direction control at an initial setting, while

DESCRIPTION OF THE PREFERRED EMBODIMENTS

The best modes and preferred embodiments of the present invention will be described hereinafter with reference to the annexed drawings. Note that the specific embodiments described are not intended to cover the entire scope of the present invention, and hence the present invention is not limited to only the specific embodiments.

Figure 1:
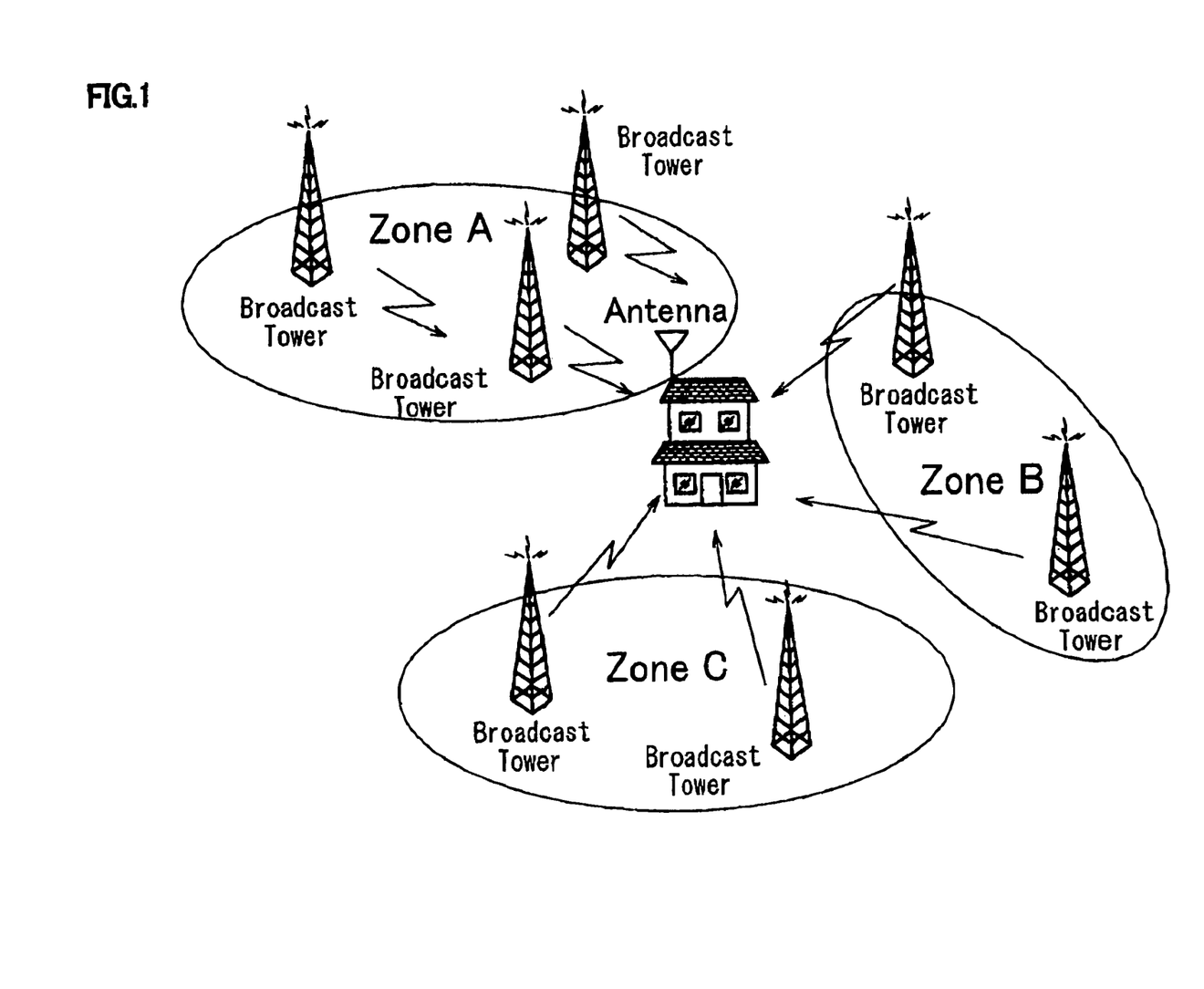
FIG. 1 is a conceptual view showing a situation in which a digital TV (television) broadcast signal receiver according to embodiments of the present invention installed in a general home receives TV broadcast signals.

A digital TV (Television) broadcast signal receiver according to an embodiment of the present invention will be described. FIG. 1 is a schematic view showing a situation in which a digital TV broadcast signal receiver, installed in a home of a user, such as a digital TV broadcast signal receiver 1 shown in later described FIG. 2 receives digital TV broadcast signals from broadcast towers located in various zones. Generally, if a digital TV broadcast signal receiver receives digital TV broadcast signals of digital (terrestrial) TV broadcast which have a signal intensity equal to or higher than a predetermined threshold value, it is possible to obtain images of a certain quality or higher, using error correction and the like. Here, it is assumed that the digital TV broadcast signal receiver in the home of the user can receive digital TV broadcast signals transmitted from broadcast towers spreading across multiple locations e.g. in zone A, zone B and zone C, and that it is possible to view TV programs transmitted from the broadcast towers. A multi-directional antenna, called a smart antenna, having multiple receiving directions is put to practical use for such situation.

Generally, a digital TV broadcast signal receiver can receive analog TV broadcast signals as well. A digital TV broadcast signal receiver which can efficiently control a best receiving direction of a multi-directional antenna for digital TV broadcast signals, confirming the number of the receiving directions of the multi-directional antenna, can similarly perform a best receiving direction control for analog TV broadcast signals. Thus, in the present specification, both the digital TV broadcast signal and the analog TV broadcast signal are referred to as TV broadcast signal when it is not necessary to distinguish between the two.

It is to be noted that a digital TV broadcast signal receiver to conform to the EIA-909 standard is required to be able to switch an active signal receiving direction of the multi-directional antenna such as the smart antenna to every one of the sixteen receiving directions, regardless of the kind of the connected multi-directional antenna and regardless of the number of receiving directions. When connected to the multi-directional antenna, the digital TV broadcast signal receiver according to the present embodiment receives, and measures receiving conditions of, digital TV broadcast signals coming from sixteen receiving directions provided in the EIA-909 standard, respectively. The digital TV broadcast signal receiver further stores, in a memory, a best or maximum direction for each channel in which the received signal intensity is maximum for the channel, and immediately orients or points the multi-directional antenna in the best direction for the channel when selected.

Figure 2:
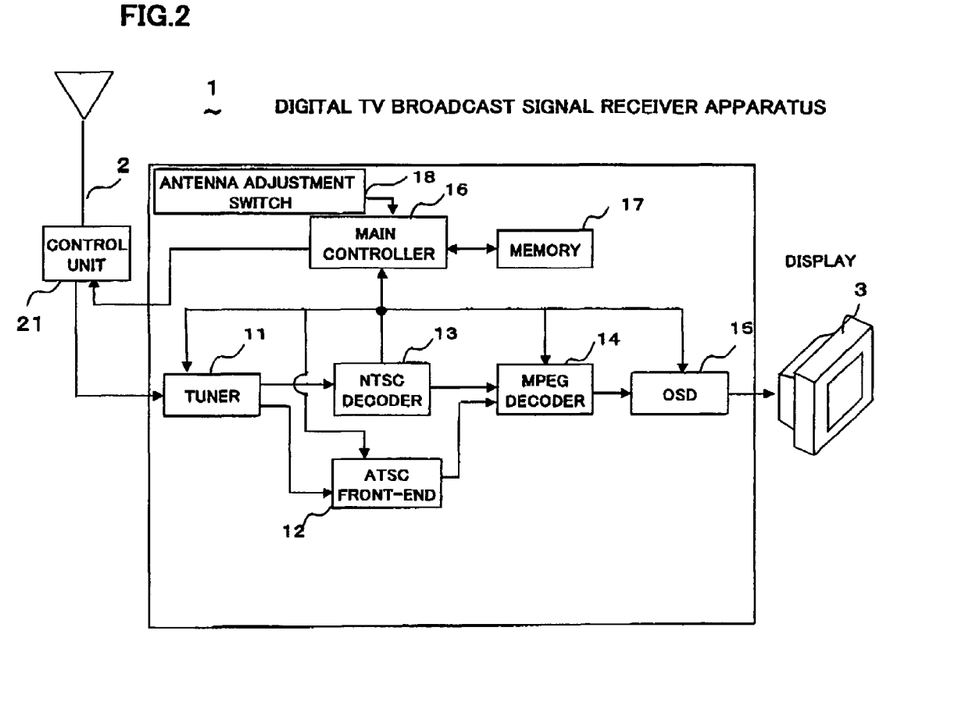
FIG. 2 is a schematic block diagram of the digital TV broadcast signal receiver according to the embodiments of the present invention.

FIG. 2 shows a digital TV broadcast signal receiver 1 according to an embodiment of the present invention. Referring to FIG. 2, the digital TV broadcast signal receiver 1 comprises: a tuner (broadcast signal receiving unit) 11 connected to a multi-directional antenna 2 for receiving a TV broadcast signal; an ATSC front end (digital signal processing unit) 12 for subjecting a digital TV broadcast signal received by the tuner 11 to predetermined signal processing, and decoding the digital TV broadcast signal; an NTSC (National Television System Committee) decoder (analog signal processing unit) 13 for decoding an analog TV broadcast signal received by the tuner 11; an MPEG (Motion Picture Experts Group) decoder 14 (decoded signal output unit) for decoding the TV broadcast signal which is an MPEG-compressed signal; and an on-screen display (hereafter referred to simply as "OSD") signal superimposer (image signal output unit) 15 for superimposing a signal of a predetermined display image on the decoded TV broadcast signal to produce a combined image signal and for outputting the combined image signal to a monitor 3.

The digital TV broadcast signal receiver 1 further comprises: a main controller (CPU) 16 for detecting receiving conditions of TV broadcast signals received by the tuner 11 so as to control an antenna controller 21 of the multi-directional antenna 2, and for controlling the entire TV broadcast signal receiver 1, namely for controlling respective elements in the digital TV broadcast signal receiver 1 including the ATSC front end 12 and the NTSC decoder 13; a memory (storage unit) 17 for temporarily storing the decoded TV broadcast signal and storing the display image to be superimposed on the decoded TV broadcast signal; and so on. The combination of the ATSC front end 12, the NTSC decoder 13 and the MPEG decoder 13 constitutes a broadcast signal processing unit for subjecting the television broadcast signal received by the tuner 11 to a predetermined signal processing. The TV broadcast signal decoded by the MPEG decoder 14 is output via the OSD signal superimposer 15 to the monitor 3 for display.

The main controller 16 serves as a receiving direction determining unit (for determining a best receiving direction for each receivable channel), an antenna direction adjustment unit (for adjusting the receiving direction of the multi-directional antenna 2), a receiving direction control signal output unit (for outputting, to the multi-directional antenna 2, a receiving direction control signal to command a receiving direction for receiving the TV broadcast signal), and an entire control unit (for controlling respective elements in the digital TV broadcast signal receiver 1). The digital TV broadcast signal receiver 1 still further comprises an antenna direction adjustment switch 18 to be pressed or operated by a user to force the digital TV broadcast signal receiver 1 into an antenna direction adjustment mode when it is necessary to adjust the receiving direction of the multi-directional antenna (smart antenna) 2. Note that although the digital TV broadcast signal receiver 1 at the user site can send data to broadcast stations in digital TV broadcasting, description thereof is omitted herein because it does not directly relate to the present invention.

The antenna controller 21 of the multi-directional antenna 2 starts its operation in response to a receiving direction control signal from the main controller 16, and makes active one of multiple receiving directions of the multi-directional antenna 2 which one is commanded by the receiving direction control signal, after the connection of the multi-directional antenna 2 to the tuner 11 is detected. If the multi-directional antenna 2 is the type that changes the receiving direction by rotating the antenna using a motor, the antenna controller 21 controls the rotation of the motor so as to point the antenna in the commanded direction. On the other hand, if the multi-directional antenna 2 is the type that selects an active antenna direction by turning on and off electronic switches, the antenna controller 21 turns on one of the electronic switches corresponding to the commanded direction, and turns off the other electronic switches.

Figure 3A:
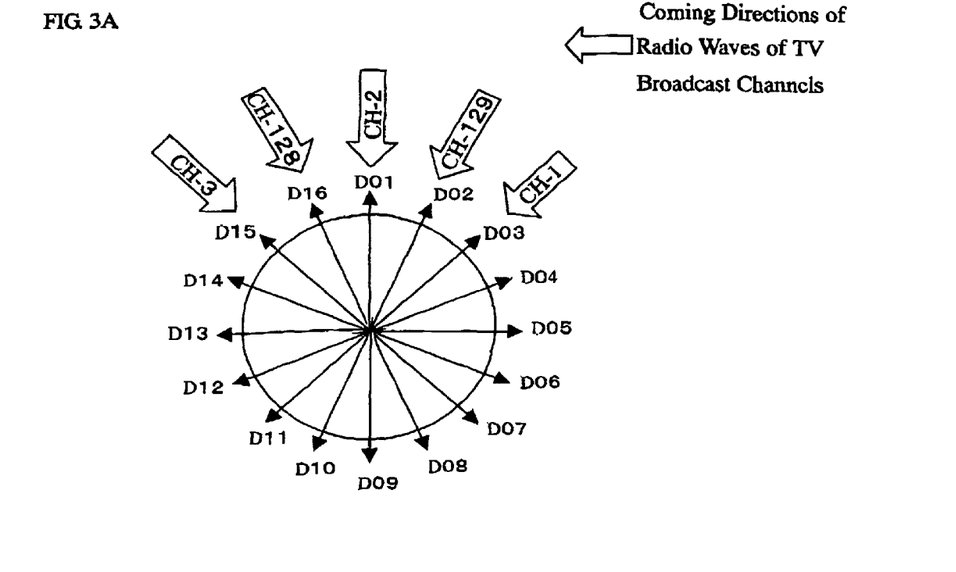
FIG. 3A and FIG. 3B are schematic charts showing an example and another example, respectively, each of receiving condition of receiving a TV broadcast signal using a multi-directional antenna.
Figure 3B:
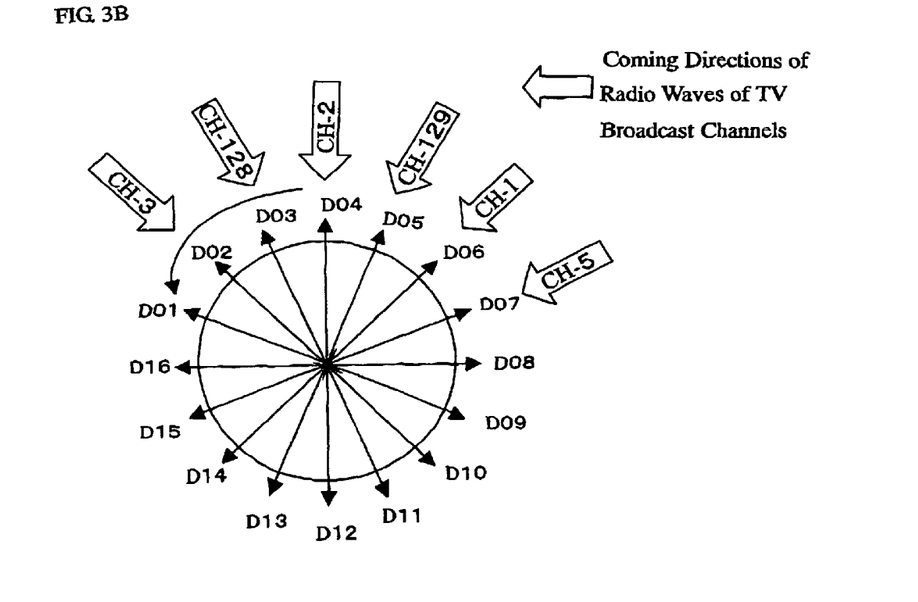

Each of FIG. 3A and FIG. 3B is a chart showing an example of receiving condition of receiving a TV broadcast signal using a multi-directional antenna 2 in the case where the multi-directional antenna 2 has sixteen receiving directions as provided in the EIA-909 standard, in which the receiving direction of the multi-directional antenna 2 in FIG. 3B is shifted from that in FIG. 3A. In each of FIG. 3A and FIG. 3B, reference characters D01 to D16 designate direction numbers of sixteen receiving directions provided in the EIA-909 standard. In FIGS. 3A and 3B, arrows each with a channel number therein indicate coming directions of radio waves of various TV broadcast channels, in which e.g. channels 1, 2, 3, 128 and 129 are referred to as CH-1, CH-2, CH-3, CH-128 and CH-129, respectively. FIG. 3A represents an example of receiving condition at an initial setting of the antenna receiving direction, while FIG. 3B represents an example of receiving condition in a state where the antenna is assumed to have moved during use and rotationally shifted in the receiving direction as indicated by the curved arrow.

More specifically, if the initial receiving direction number D01 for CH-2 shown in FIG. 3A to enable receiving the channel is shifted as shown by the curved arrow so that the receiving direction number D04 becomes pointed at CH-2, the multi-directional antenna 2 is brought to a state where it cannot receive any channel. This is because the data of receiving directions of the antenna remain unchanged so that the receiving direction number for CH-2 is maintained as D01 in which no TV radio waves come. In order to receive CH-2, it is necessary to change the receiving direction number of the multi-directional antenna 2 for CH-2 to D04. Similarly, in order to receiver the other channels, it is necessary to change the receiving direction number of the multi-directional antenna 2 for each of the other channels to a new receiving direction number according to the rotational shift of the multi-directional antenna 2.

Figure 4:
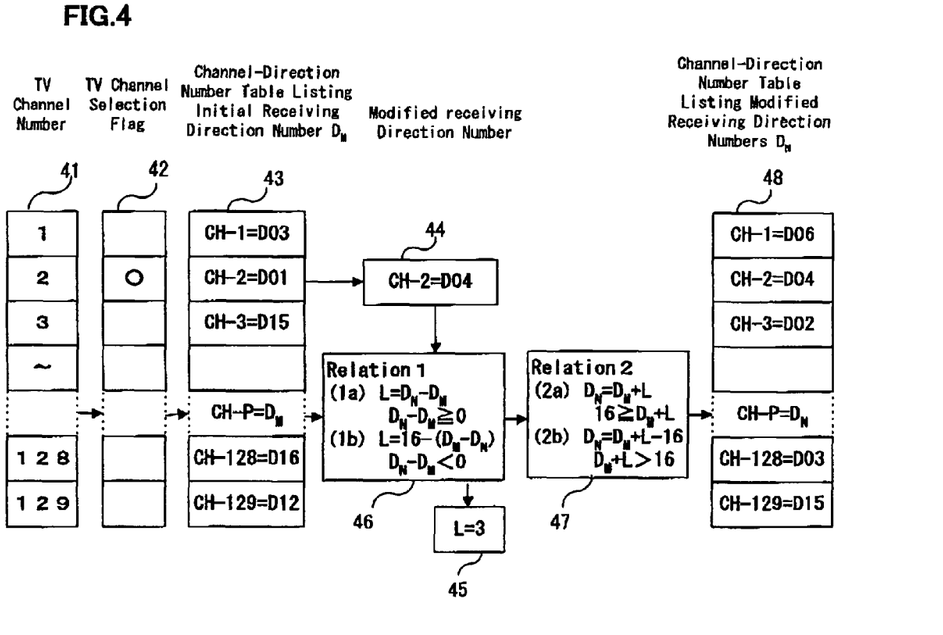
FIG. 4 is a schematic chart showing steps to modify the receiving direction numbers for all channels.

FIG. 4 is a schematic chart showing steps to modify the receiving direction numbers for the channels in order to solve the above problem. Referring to FIG. 4, reference numeral 41 designates a physical TV channel table, and reference numeral 42 designates a channel selection flag table, while reference numeral 43 designates a channel-direction number table listing an initial receiving direction number $D_M$ for each channel as stored in the memory 17 at the initial setting of the multi-directional antenna (smart antenna) 2. It is assumed here that CH-2 is selected by using the channel selection flag as indicated by a circle "○" in the table 42, and that the initial receiving direction number $D_M$ ($D_M$ being an initial receiving direction number for an arbitrary channel P) for CH-2 as stored in the memory 17 at the initial setting of the multi-directional antenna 2 is D01 as shown in the table 43.

When the multi-directional antenna 2 is rotationally shifted for some reason, the main controller 16 (antenna direction adjustment unit) performs an omni-directional scanning process for finding a best receiving direction for CH-2 again as will be described later. Here, it is further assumed that the main controller 16 (antenna direction adjustment unit) finds receiving direction number D04 as a new best receiving direction number or modified receiving direction number for CH-2. Reference numeral 44 designates a modified receiving direction number for the selected channel as a result of omni-directional scanning process. The main controller 16 calculates a receiving direction number difference L, which is amount of rotational shift, between $D_M$ and $D_N$ on the basis of relation 1, either relation (1a) or relation (1b), as indicated by reference numeral 45 where $D_M$ is the initial receiving direction number as described above, and $D_N$ is the modified receiving direction number for the arbitrary channel P. In the case of CH-2 here, the receiving direction number difference L calculated by the main controller 16 is 3 as indicated by reference numeral 46.

Based on the thus calculated receiving direction number difference L and on relation 2, either relation (2a) or relation (2b), as indicated by reference numeral 47, the main controller 16 (antenna direction adjustment unit) calculates modified receiving direction numbers $D_N$ of the multi-directional antenna 2 for all the channels, in addition to CH-2, after the rotational shift of the multi-directional antenna 2 as shown by a table designated by reference numeral 48, which is a channel-direction number table listing modified receiving direction numbers $D_N$.

In other words, according to the present embodiment, a rotational shift in the receiving direction of the multi-directional antenna 2 for one or at least one channel is first obtained, and hence a modified receiving direction of the one channel is first obtained. Thereafter, based on the thus obtained rotational shift, the modified receiving directions for the other channels are obtained. This will be more specifically described below.

Hereinafter, referring to the flow chart of FIG. 5A and FIG. 5B, a receiving direction control of the multi-directional antenna 2 which the main controller 16 (antenna direction adjustment unit) of the digital TV broadcast signal receiver 1 performs will be described.

Figure 5A:
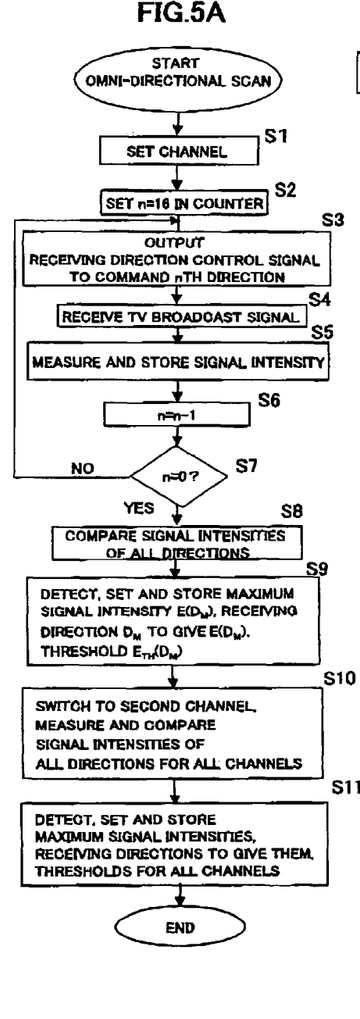

Referring to the flow chart of FIG. 5A, which shows a process of a receiving direction control at an initial setting, when the main controller 16 detects the connection of the multi-directional antenna 2 to the tuner 11, the main controller 16 performs an initial receiving direction setting. More specifically, the main controller 16 (antenna direction adjustment unit) first starts an omni-directional scanning process. When one channel (local channel) is set as a first channel for the process (S1), the main controller 16 sets n=16 in a counter (S2), and outputs a receiving direction control signal to command an nth receiving direction (S3). After a certain time required for the main controller 16 to output the receiving direction control signal to the antenna controller 21 of the multi-directional antenna 2 and to switch the receiving direction of the multi-directional antenna 2, the tuner 11 receives a TV broadcast signal of a certain channel (S4). The main controller 16 (antenna direction adjustment unit) commands the tuner 11 to measure the signal intensity of the TV broadcast signal, and stores data of the measured signal intensity in the memory 17 (S5).

The main controller 16 (antenna direction adjustment unit) sequentially outputs, to the multi-directional antenna 2 at given time intervals, the receiving direction control signal to sequentially command receiving directions of the multi-directional antenna 2 as follows. The main controller 16 decrements the counter by one (S6), and determines whether the signal intensities of the TV broadcast signal in all the sixteen receiving directions have been measured by the tuner 11 (S7). If the signal intensities of the TV broadcast signal in all the sixteen receiving directions have not been measured by the tuner 11, the main controller 16 goes back to the step S3, and commands the tuner 11 to measure the signal intensity or intensities of the TV broadcast signal not having been measured (more specifically measure the signal intensity of the TV broadcast signal in each subsequent receiving direction until completion).

If the TV broadcast signal receiver 1 completes the measurements of the signal intensities of the TV broadcast signal for all the sixteen receiving directions (YES in S7), so that the TV broadcast signal receiver 1 stores all the measured data of signal intensities in the memory 17, the main controller 16 (antenna direction adjustment unit) reads the measured data stored in the memory 17. The main controller 16 then compares all the signal intensities (S8), and thereby detects a maximum receiving direction $D_M$ to give maximum signal intensity $E(D_M)$ for the first channel. Based on the maximum signal intensity $E(D_M)$, the main controller 16 sets a threshold value $E_{TH}(D_M)$ to be used next time to adjust the receiving direction of the multi-directional antenna 2 for the first channel. The main controller 16 further stores the data of the maximum receiving direction $D_M$, the maximum signal intensity $E(D_M)$ and the threshold value $E_{TH}(D_M)$ in the memory 17 as initial setting values for the first channel (S9).

Next, the main controller 16 switches the channel to a subsequent channel (subsequent local channel) as a second channel for the process, and performs measurements and settings similar to those for the first channel in a manner similar to that for the first channel as described above (S10). Thereby, the main controller 16 stores the data of the maximum receiving direction $D_M$, the maximum signal intensity $E(D_M)$ and the threshold value $E_{TH}(D_M)$ in the memory 17 as initial setting values for the second channel. The main controller 16 repeats such process for each of the other channels so as to store the data of the maximum receiving direction $D_M$, the maximum signal intensity $E(D_M)$ and the threshold value $E_{TH}(D_M)$ in the memory 17 as initial setting values for each of all the channels (local channels) (S11), thereby ending the initial setting.

Each of the threshold values $E_{TH}(D_M)$ described above and threshold values $E_{TH}(D_N)$ described later is set to be lower by a predetermined level, such as a few dB (decibels) or 3 to 6 dB, than each of the corresponding maximum signal intensities $E(D_M)$ and $E(D_N)$ so that each of such threshold values can serve as a reference to start an omni-directional scanning process of the multi-directional antenna 2. Furthermore, as will also be also described later, the multi-directional antenna (smart antenna) 2 is designed to start its scanning operation with a predetermined delay (weak attack delay) time at the time of starting such operation in a manner that even when the signal intensity of the received TV broadcast signal is lower than the threshold value, the main controller 16 does not immediately start the scanning operation and waits the predetermined delay time, and that the main controller 16 starts the scanning operation only after the predetermined delay time if the signal intensity remains lower than the threshold value for the predetermined delay time. The use of this delay time makes it possible to control such that the operation does not respond to sudden and instantaneous signal level variations, thereby preventing unnecessary antenna scanning operation and achieving stable receiving of video images.

Figure 5B:
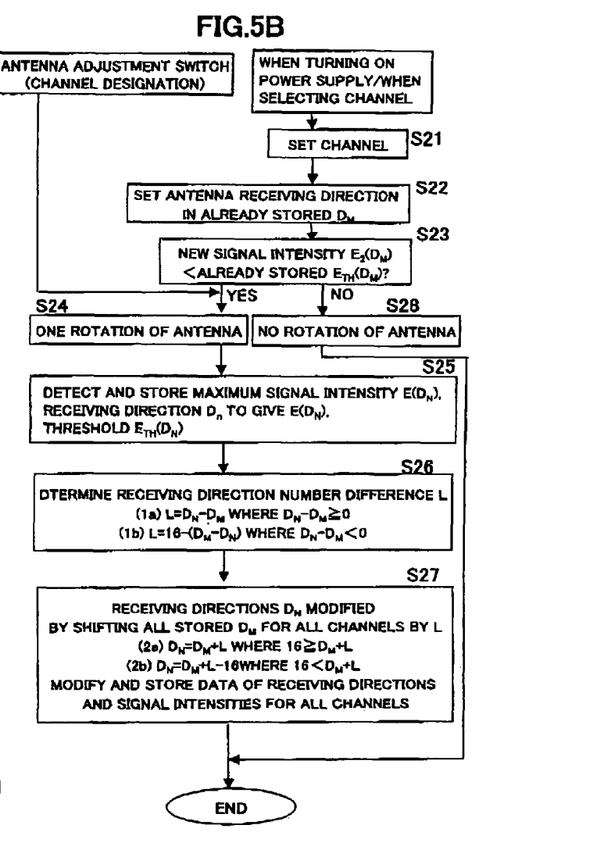
FIG. 5B is a flow chart showing a process of a receiving direction control for obtaining modified receiving directions.

Next, referring to the flow chart of FIG. 5B, the following describes a receiving direction control of the multi-directional antenna 2 for obtaining modified receiving directions, when the multi-directional antenna 2 rotationally shifts physically for some reason after the main controller 16 (antenna direction adjustment unit) stores the data of the maximum receiving direction $D_M$, the maximum signal intensity $E(D_M)$ and the threshold value $E_{TH}(D_M)$ in the memory 17 as the initial setting values for each of all the channels (local channels) as described above with reference to FIG. 5A.

Referring to FIG. 5B, when a channel A (referred to as "CH-A") to receive is selected and set (S21), the main controller 16 (antenna direction adjustment unit) sets the receiving direction of the multi-directional antenna 2 in direction $D_M$ ($D_M$ being a receiving direction for CH-A to give maximum signal intensity at the initial receiving direction setting for CH-A) based on the data already stored in the memory 17 at the initial setting (S22). In the receiving direction $D_M$, the main controller 16 commands the tuner 11 to measure signal intensity of a TV broadcast signal which the tuner 11 receives. It is assumed here that the signal intensity currently received and measured is $E_2(D_M)$, which is different from the maximum signal intensity $E(D_M)$ at the initial setting of the antenna receiving direction.

If $E_2(D_M)$ is, and remains for the predetermined delay (weak attack delay) time, lower than the threshold value $E_{TH}(D_M)$ at the initial setting (YES in S23), the main controller 16 outputs a receiving direction control signal to the multi-directional antenna 2 to perform an omni-directional scanning process for one rotation through the sixteen receiving directions of the multi-directional antenna 2 (S24) so as to find a receiving direction to give a maximum signal intensity. If the maximum signal intensity is equal to a predetermined level or higher (such maximum signal intensity being designated by $E(D_N)$, and the receiving direction to give $E(D_N)$ being designated by $D_N$) to enable image display of a predetermined quality or higher so that the receiving direction $D_N$ is a new best receiving direction or modified receiving direction to give the maximum signal intensity $E(D_N)$, then the main controller 16 stores, separately in the memory 17, the maximum receiving direction $D_N$, the maximum signal intensity $E(D_N)$ and a threshold value $E_{TH}(D_N)$ based on the maximum signal intensity $E(D_N)$ that are data of the multi-directional antenna 2 after the rotational shift (S25).

Note that when a user finds a physical rotational shift of the multi-directional antenna 2, the digital TV broadcast signal receiver 1 can be forced into an antenna direction adjustment mode by the operation of the user to press to turn on the antenna direction adjustment switch 18 for a channel designated by the user. Also note that if NO in S23, so that the signal intensity $E_2(D_M)$ received and measured is equal to or higher than the corresponding threshold value $E_{TH}(D_M)$, the main controller 16 does not perform the omni-directional scanning process or scanning rotation.

Referring back to FIG. 5B, the receiving direction number difference L (amount of rotational shift) between $D_M$ and $D_N$ for CH-A is obtained by the measurements where $D_M$ is the initial receiving direction number for CH-A, and $D_N$ is the modified receiving direction number for CH-A. More specifically, the main controller 16 (antenna direction adjustment unit) determines the receiving direction number difference L for CH-A by calculation such that (1a) $L=D_N-D_M$ where $D_N-D_M \geqq -0$ and (1b) $L=16-(D_M-D_N)$ where $D_N-D_M<0$ (S26).

Using the receiving direction number difference L (amount of rotational shift) between $D_M$ and $D_N$ for CH-A as obtained in the step S26, the main controller 16 (antenna direction adjustment unit) determines the modified receiving direction numbers $D_N$ for the other channels by adding the receiving direction number difference L to the initial receiving direction numbers $D_M$ for the other channels so as to shift the receiving direction numbers, stored in the memory 17, of the sixteen receiving directions at one time by the amount of the receiving direction number difference L. More specifically, the main controller 16 determines the modified receiving direction numbers $D_N$ for the other channels after the shift by calculation such that (2a) $D_N=D_M+L$ where $16 \geq D_M+L$, and (2b) $D_N=D_M+L-16$ where $16<D_M+L$ (S27). The main controller 16 renews the data of all the receiving direction numbers in this manner, and stores the renewed data of the receiving direction numbers in storage locations in the memory 17 separate from those having the initial data of the receiving direction numbers stored therein. Furthermore, the main controller 16 electronically shifts the storage locations of other stored data such as signal intensities to storage locations in the memory 17 that are linked to the renewed data of the receiving direction numbers. Thereby, all the stored data for all the channels can be easily renewed.

In connection with the predetermined delay time (weak attack delay), the following should be noted. The rotational shift of the multi-directional antenna 2 may occur frequently. In response to such rotational shift, it may be necessary to frequently perform the omni-directional scanning or scanning rotation of the multi-directional antenna 2 to adjust the receiving directions of the multi-directional antenna 2. In the case where it causes the omni-directional scanning or scanning rotation of the multi-directional antenna 2 to occur more than predetermined times, i.e. for more than predetermined rotations, per a predetermined time period, it may be necessary to quickly perform the omni-directional scanning or scanning rotation of the multi-directional antenna 2. This can be achieved in a manner that the main controller 16 (antenna direction adjustment unit) makes the predetermined delay time (weak attack delay) inactive (namely prevents the predetermined delay time from functioning) to keep the multi-directional antenna 2 in a rotation mode. On the other hand, if the omni-directional scanning or scanning rotation of the multi-directional antenna 2 due to the rotational shift of the multi-directional antenna 2 does not occur more than the predetermined times (for more than the predetermined rotations) per a predetermined time period, i.e. if it occurs within the predetermined rotations per the predetermined time period, the main controller 16 (antenna direction adjustment unit) keeps the predetermined delay time (weak attack delay) active (namely causes the predetermined delay time to keep functioning) so as to prevent the multi-directional antenna 2 from being kept in the rotation mode.

As described in the foregoing, the digital TV broadcast signal receiver according to the present invention first determines, for one channel, a difference between a receiving direction of a multi-directional antenna stored at an initial setting and a modified receiving direction of the antenna measured after a rotational shift of the antenna. Thereby, the amount of the rotational shift (difference in the receiving direction due to the rotational shift) can be easily obtained. Using the amount of the rotational shift for the one channel, it is possible to renew or rewrite the stored data of receiving directions for all channels, and hence the data of maximum signal intensities linked and corresponding thereto as well, easily in a short time by shifting the receiving direction number for each of the channels by the same amount of the rotational shift. Thus, when the multi-directional antenna rotationally shifts, it is not necessary to make measurements for all the channels again, or to consume unnecessary time and energy for adjusting the receiving direction of the multi-directional antenna, thereby making it possible to immediately provide a normal receiving of a TV broadcast signal, and preventing a user from getting irritated.

It is to be noted that the present invention is not limited to the above embodiments, and various modifications are possible. For example, according to the above embodiments, one channel is subjected to the measurements for determining the amount of the rotational shift of the multi-directional antenna. Using the data of the amount of the rotational shift for the one channel, the data of the receiving direction numbers for the other channels are renewed. However, in some cases, it may be difficult to determine a receiving direction by making measurements for one channel, for example, in the case where there are multiple receiving directions for receiving one channel.

In such case, three channels, for example, can be subjected to the measurements. More specifically, the digital TV broadcast signal receiver can perform as follows. The main controller 16 (antenna direction adjustment unit) newly measures signal intensities of TV broadcast signals for the three channels after the rotational shift of the multi-directional antenna, so as to obtain data of new or modified receiving direction numbers to give new best receiving directions for the three channels. The main controller 16 compares these modified receiving direction numbers with the corresponding three initial receiving direction numbers stored in the TV broadcast signal receiver (memory 17) at an initial setting so as to obtain three differences in the receiving direction number between the initial receiving direction numbers and the modified receiving direction numbers for the three channels, respectively. If at least two of the three differences in the receiving direction number give the same value of difference, the main controller 16 uses such value as an amount of receiving direction difference of the rotational shift of the multi-directional antenna. Thereby, a more accurate adjustment of the receiving direction of the multi-directional antenna can be achieved. In other words, using data of receiving directions for multiple channels, a more accurate receiving direction number difference with less error can be obtained, thereby improving the accuracy of adjusting the receiving directions for all the channels.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A digital television broadcast signal receiver connected to a multi-directional antenna having multiple receiving directions for receiving a television broadcast signal by making one of the multiple receiving directions active, the digital television broadcast signal receiver comprising:
a receiving direction control signal output unit for outputting, to the multi-directional antenna, a receiving direction control signal to command a receiving direction for receiving the television broadcast signal;
a tuner connected to the multi-directional antenna for receiving the television broadcast signal and measuring signal intensity of the received television broadcast signal;
a broadcast signal processing unit for subjecting the television broadcast signal received by the tuner to a predetermined signal processing;
an image signal output unit for outputting, to a monitor, the television broadcast signal having been subjected to the predetermined signal processing by the broadcast signal processing unit;
a memory for temporarily storing the television broadcast signal having been subjected to the predetermined signal processing by the broadcast signal processing unit;

a receiving direction determining unit for determining a best receiving direction for each receivable channel using the television broadcast signal stored in the memory;

an antenna direction adjustment unit controlled by the receiving direction control signal output unit for adjusting rotational shift of the receiving direction of the multi-directional antenna; and a main controller for controlling respective elements in the digital television broadcast signal receiver;

wherein the receiving direction control signal output unit sequentially outputs, to the multi-directional antenna at given time intervals, a receiving direction control signal to sequentially command receiving directions of the multi-directional antenna for omni-directional scanning, wherein the tuner sequentially measures signal intensities of the television broadcast signal in the multiple receiving directions for each of multiple channels, wherein the antenna direction adjustment unit stores, in the memory: the measured signal intensities in the respective receiving directions; a best receiving direction to give a maximum signal intensity for each of the channels; and the maximum signal intensity for the each of the channels in the best receiving direction, wherein when detecting that the signal intensity of a television broadcast signal for one channel received by the tuner is lower than the maximum signal intensity for the received channel stored in the memory, the receiving direction control signal output unit controls the receiving direction of the multi-directional antenna, and wherein when a further receiving direction to give a maximum signal intensity for at least one of the channels newly received by the tuner is different from the receiving direction to give the maximum signal intensity of the same at least one of the channels which is stored in the memory, the antenna direction adjustment unit determines a receiving direction number difference of the multi-directional antenna, in the multiple receiving directions, between the receiving direction and the further receiving direction for the same at least one of the channels, and shifts the receiving direction numbers, stored in the memory, of the multiple receiving directions at one time by the receiving direction number difference so as to electronically renew, at one time, data of the receiving directions and the signal intensities for all the channels stored in the memory.

2. The digital television broadcast signal receiver according to claim 1, wherein the antenna direction adjustment unit newly measures signal intensities of television broadcast signals for three channels, so as to obtain data of further receiving direction numbers to give best receiving directions for the three channels, wherein the antenna direction adjustment unit compares the further receiving direction numbers with the corresponding three receiving direction numbers stored in the memory so as to obtain three differences in the receiving direction number between the receiving direction numbers stored in the memory and the further receiving direction numbers for the three channels, respectively, and wherein if at least two of the three differences in the receiving direction number give the same value of difference, the antenna direction adjustment unit uses such value as the receiving direction number difference of the multi-directional antenna.

3. The digital television broadcast signal receiver according to claim 1, which further comprises an antenna direction adjustment switch to be operated by a user to force the digital television broadcast signal receiver into an antenna direction adjustment mode, wherein when the tuner sequentially measures signal intensities of the television broadcast signal in the multiple receiving directions for the each of multiple channels, the main controller further stores, in the memory, a threshold value for the each of the channels which is set to be lower by a predetermined level than the maximum signal intensity for the each of the channels so as to serve as a reference to start the omni-directional scanning of the multi-directional antenna, wherein when detecting that the signal intensity of a television broadcast signal for one channel received by the tuner is lower than the threshold value for the received channel stored in the memory, the receiving direction control signal output unit controls the receiving direction of the multi-directional antenna, wherein when signal intensity for at least one of the channels newly received by the tuner is, and remains for a predetermined delay time, lower than the threshold value stored in the memory, or when the user turns on the antenna direction adjustment switch, the antenna direction adjustment unit performs a new omni-directional scanning for one rotation through the multiple receiving directions of the multi-directional antenna so as to obtain a receiving direction number, being referred to as $D_N$, to give a maximum signal intensity among the multiple receiving directions, and stores, in the memory, the receiving direction number $D_N$ and the maximum signal intensity in the receiving direction number $D_N$, wherein the antenna direction adjustment unit compares the receiving direction number $D_N$ with the receiving direction number, being referred to as $D_M$, for the same at least one of the channels which is stored in the memory before the new omni-directional scanning, so as to determine a receiving direction number difference, being referred to as L, between the receiving direction numbers $D_N$ and $D_M$, and wherein the antenna direction adjustment unit shifts, at one time by the receiving direction number difference L, both the receiving direction numbers and the signal intensities linked to the receiving direction numbers of the multiple receiving directions, all of which are stored in the memory, so as to electronically renew, at one time, the data of the receiving directions and the signal intensities for all the channels stored in the memory.

4. The digital television broadcast signal receiver according to claim 3, wherein the antenna direction adjustment unit newly measures signal intensities of television broadcast signals for three channels, so as to obtain data of further receiving direction numbers to give best receiving directions for the three channels, wherein the antenna direction adjustment unit compares the further receiving direction numbers with the corresponding three receiving direction numbers stored in the memory so as to obtain three differences in the receiving direction number between the receiving direction numbers stored in the memory and the further receiving direction numbers for the three channels, respectively, and wherein if at least two of the three differences in the receiving direction number give the same value of difference, the antenna direction adjustment unit uses such value as the receiving direction number difference of the multi-directional antenna.

5. The digital television broadcast signal receiver according to claim 3,
wherein when the omni-directional scanning of the multi-directional antenna is caused to occur for more than predetermined rotations per a predetermined time period, the antenna direction adjustment unit makes the predetermined delay time inactive, while when the omni-directional scanning of the multi-directional antenna occurs within the predetermined rotations per the predetermined time period, the antenna direction adjustment unit keeps the predetermined delay time active.

6. The digital television broadcast signal receiver according to claim 5,
wherein the antenna direction adjustment unit newly measures signal intensities of television broadcast signals for three channels, so as to obtain data of further receiving direction numbers to give best receiving directions for the three channels,
wherein the antenna direction adjustment unit compares the further receiving direction numbers with the corresponding three receiving direction numbers stored in the memory so as to obtain three differences in the receiving direction number between the receiving direction numbers stored in the memory and the further receiving direction numbers for the three channels, respectively, and
wherein if at least two of the three differences in the receiving direction number give the same value of difference, the antenna direction adjustment unit uses such value as the receiving direction number difference of the multi-directional antenna.

7. A digital television broadcast signal receiver connected to a multi-directional antenna having multiple receiving directions for receiving a television broadcast signal by making one of the multiple receiving directions active,
the digital television broadcast signal receiver comprising:
a receiving direction control signal output unit for outputting, to the multi-directional antenna, a receiving direction control signal to command a receiving direction for receiving the television broadcast signal;
a tuner connected to the multi-directional antenna for receiving the television broadcast signal and measuring signal intensity of the received television broadcast signal;
a broadcast signal processing unit for subjecting the television broadcast signal received by the tuner to a predetermined signal processing;
an image signal output unit for outputting, to a monitor, the television broadcast signal having been subjected to the predetermined signal processing by the broadcast signal processing unit;
a memory for temporarily storing the television broadcast signal having been subjected to the predetermined signal processing by the broadcast signal processing unit;
a receiving direction determining unit for determining a best receiving direction for each receivable channel using the television broadcast signal stored in the memory;
an antenna direction adjustment unit controlled by the receiving direction control signal output unit for adjusting rotational shift of the receiving direction of the multi-directional antenna;
an antenna direction adjustment switch to be operated by a user to force the digital television broadcast signal receiver into an antenna direction adjustment mode, and
a main controller for controlling respective elements in the digital television broadcast signal receiver;
wherein the receiving direction control signal output unit sequentially outputs, to the multi-directional antenna at given time intervals, a receiving direction control signal to sequentially command receiving directions of the multi-directional antenna for omni-directional scanning,
wherein the tuner sequentially measures signal intensities of the television broadcast signal in the multiple receiving directions for each of multiple channels,
wherein the antenna direction adjustment unit stores, in the memory: the measured signal intensities in the respective receiving directions; a best receiving direction to give a maximum signal intensity for each of the channels; the maximum signal intensity for the each of the channels in the best receiving direction; and a threshold value for the each of the channels which is set to be lower by a predetermined level than the maximum signal intensity for the each of the channels so as to serve as a reference to start the omni-directional scanning of the multi-directional antenna,
wherein when detecting that the signal intensity of a television broadcast signal for one channel received by the tuner is lower than the threshold value for the received channel stored in the memory, the receiving direction control signal output unit controls the receiving direction of the multi-directional antenna,
wherein when signal intensity for at least one of the channels newly received by the tuner is, and remains for a predetermined delay time, lower than the threshold value stored in the memory, or when the user turns on the antenna direction adjustment switch, the antenna direction adjustment unit performs a new omni-directional scanning for one rotation through the multiple receiving directions of the multi-directional antenna so as to obtain a receiving direction number, being referred to as $D_N$, to give a maximum signal intensity among the multiple receiving directions, and stores, in the memory, the receiving direction number $D_N$ and the maximum signal intensity in the receiving direction number $D_N$,
wherein the antenna direction adjustment unit compares the receiving direction number $D_N$ with the receiving direction number, being referred to as $D_M$, for the same at least one of the channels which is stored in the memory before the new omni-directional scanning, so as to determine a receiving direction number difference, being referred to as L, between the receiving direction numbers $D_N$ and $D_M$,
wherein the antenna direction adjustment unit shifts, at one time by the receiving direction number difference L, both the receiving direction numbers and the signal intensities linked to the receiving direction numbers of the multiple receiving directions, all of which are stored in the memory, so as to electronically renew, at one time, the data of the receiving directions and the signal intensities for all the channels stored in the memory, and
wherein when the omni-directional scanning of the multi-directional antenna is caused to occur for more than predetermined rotations per a predetermined time period, the antenna direction adjustment unit makes the predetermined delay time inactive, while when the omni-directional scanning of the multi-directional antenna occurs within the predetermined rotations per the predetermined time period, the antenna direction adjustment unit keeps the predetermined delay time active.

8. The digital television broadcast signal receiver according to claim 7, wherein the antenna direction adjustment unit newly measures signal intensities of television broadcast signals for three channels, so as to obtain data of further receiving direction numbers to give best receiving directions for the three channels, wherein the antenna direction adjustment unit compares the further receiving direction numbers with the corresponding three receiving direction numbers stored in the memory so as to obtain three differences in the receiving direction number between the receiving direction numbers stored in the memory and the further receiving direction numbers for the three channels, respectively, and wherein if at least two of the three differences in the receiving direction number give the same value of difference, the antenna direction adjustment unit uses such value as the receiving direction number difference of the multi-directional antenna.

* * * * *